US009963337B2

(12) United States Patent
Liccioni et al.

(10) Patent No.: US 9,963,337 B2
(45) Date of Patent: May 8, 2018

(54) TANK WITH AN INTEGRAL FILTER AND BEVERAGE DISPENSING APPLIANCE COMPRISING SUCH A TANK

(71) Applicant: TREFLE GROUPE, Evry (FR)

(72) Inventors: Thomas Liccioni, Montrouge (FR); Robert Liccioni, Lesigny (FR)

(73) Assignee: TREFLE GROUPE, Evry (FR)

( * ) Notice: Subject to any disclaimer, the term of this patent is extended or adjusted under 35 U.S.C. 154(b) by 842 days.

(21) Appl. No.: 14/258,507

(22) Filed: Apr. 22, 2014

(65) Prior Publication Data

US 2014/0319034 A1 Oct. 30, 2014

(30) Foreign Application Priority Data

Apr. 29, 2013 (FR) ...................................... 13 53925
Jun. 4, 2013 (FR) ...................................... 13 55081

(51) Int. Cl.
| | |
|---|---|
| *B01D 15/08* | (2006.01) |
| *C02F 3/00* | (2006.01) |
| *B67D 1/08* | (2006.01) |
| *B01D 35/027* | (2006.01) |
| *B67D 1/00* | (2006.01) |

(52) U.S. Cl.
CPC ............ *B67D 1/0801* (2013.01); *B01D 15/08* (2013.01); *B01D 35/027* (2013.01); *B67D 1/0014* (2013.01); *C02F 3/00* (2013.01); *B67D 2210/0001* (2013.01); *B67D 2210/00015* (2013.01); *C02F 2307/10* (2013.01)

(58) Field of Classification Search
CPC ............... B67D 1/0009; B67D 1/0014; B67D 2210/0001; B67D 2210/00002; B67D 2210/00015; C02F 1/002; C02F 1/003; C02F 9/005; C02F 2307/02; C02F 2307/10; B01D 35/027
See application file for complete search history.

(56) References Cited

U.S. PATENT DOCUMENTS

| | | | |
|---|---|---|---|
| 5,979,709 A | 11/1999 | Liccioni | |
| 6,093,312 A * | 7/2000 | Boulter | ................ B67D 1/0009 210/109 |
| 8,779,384 B2 * | 7/2014 | Lee | ......................... C02F 1/325 250/428 |

(Continued)

FOREIGN PATENT DOCUMENTS

| | | |
|---|---|---|
| DE | 203 12 951 U1 | 10/2003 |
| EP | 0 905 084 A1 | 3/1999 |

(Continued)

OTHER PUBLICATIONS

English Translation of DE20312951 U1, Dec. 2003.*
French Search Report, dated Nov. 22, 2013, from corresponding FR application.

*Primary Examiner* — Terry K Cecil
(74) *Attorney, Agent, or Firm* — Young & Thompson

(57) ABSTRACT

A tank (101) for a beverage dispensing appliance includes at least one water chamber (102), a first opening (104) for example for connecting the tank (101) to a beverage supply, at least one second opening (105) for example suitable for attaching to a tap for dispensing beverages, as well as a filter (107) attached to the second opening (105) of the tank (101). An appliance including such a removable tank (101) is also described.

20 Claims, 15 Drawing Sheets

(56) References Cited

U.S. PATENT DOCUMENTS

2004/0134932 A1    7/2004  Lobdell
2010/0000931 A1    1/2010  Castillo
2014/0166498 A1*   6/2014  Orolin .................. C02F 1/4672
                                                            205/743

FOREIGN PATENT DOCUMENTS

| WO | 02/26615 A1 | 4/2002 |
| WO | 2009/001061 A2 | 12/2008 |
| WO | 20120136915 A1 | 10/2012 |

* cited by examiner

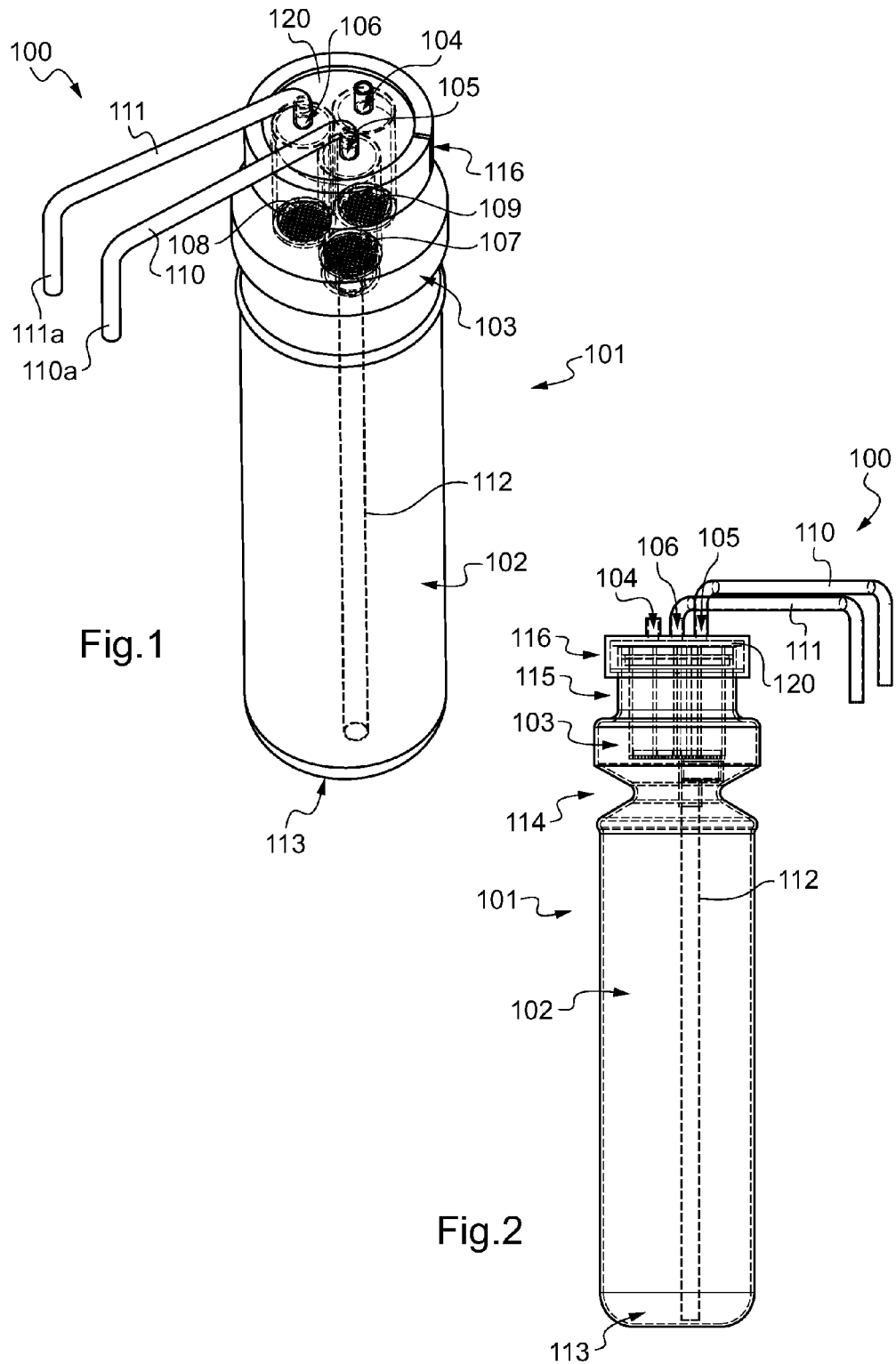

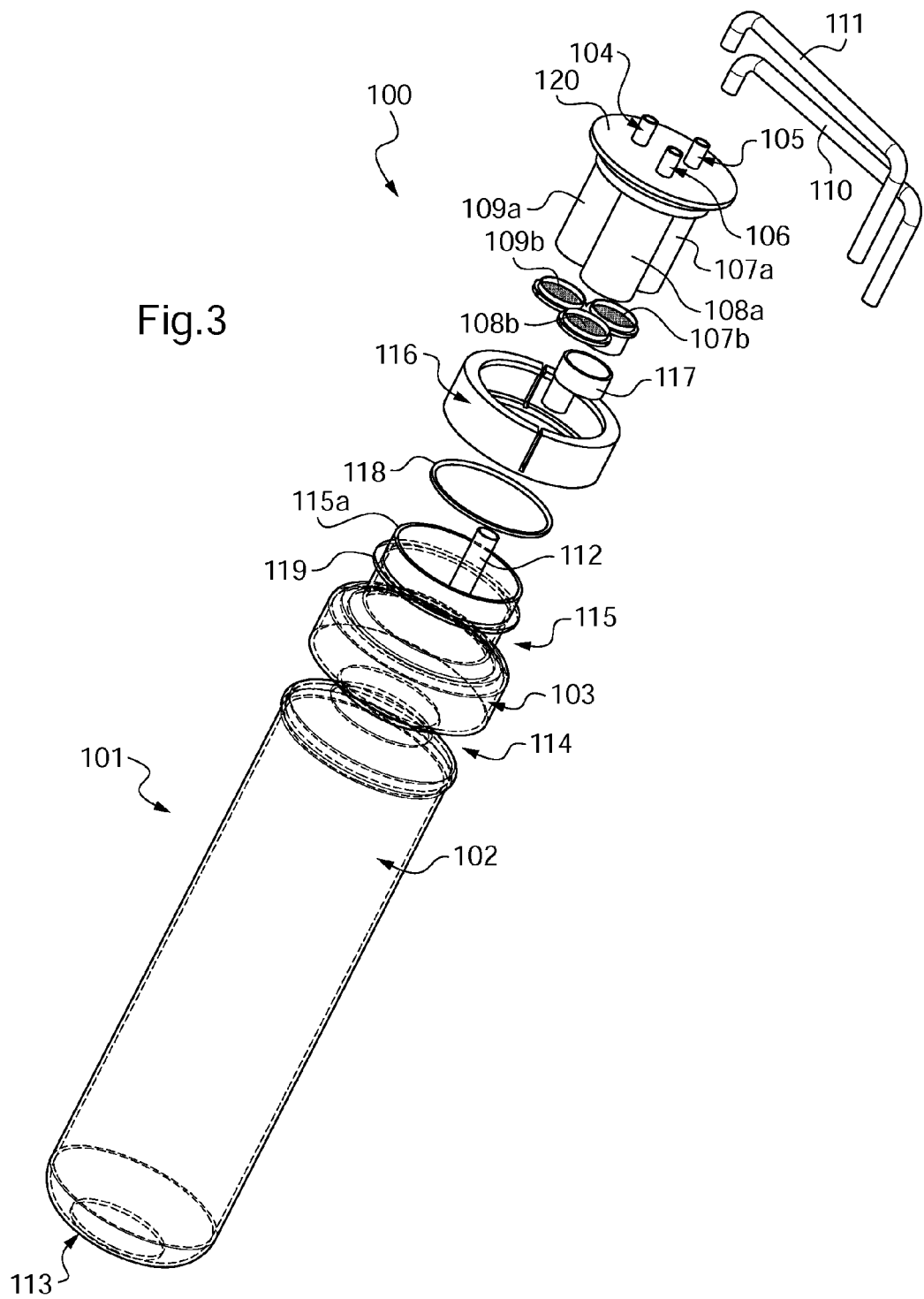

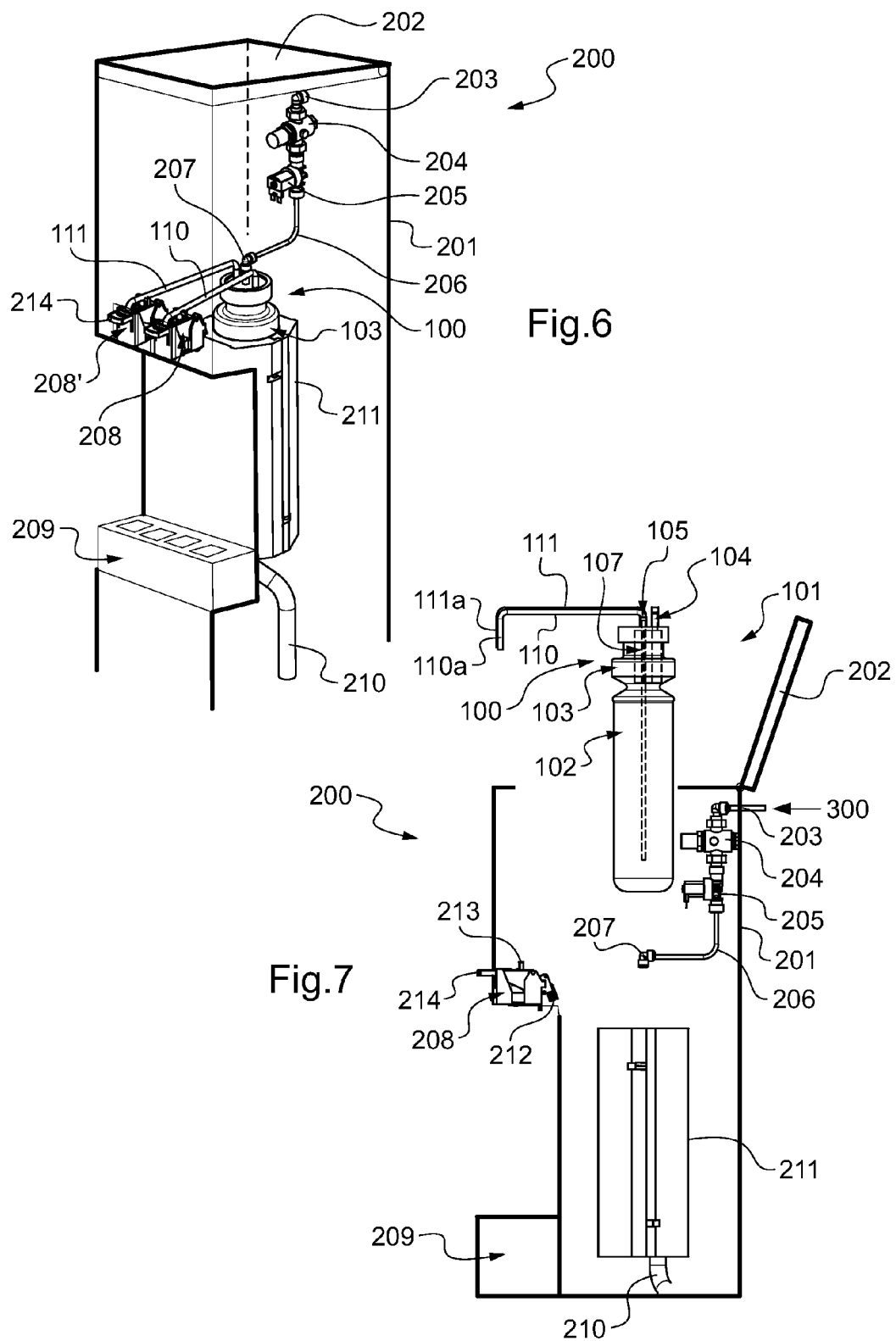

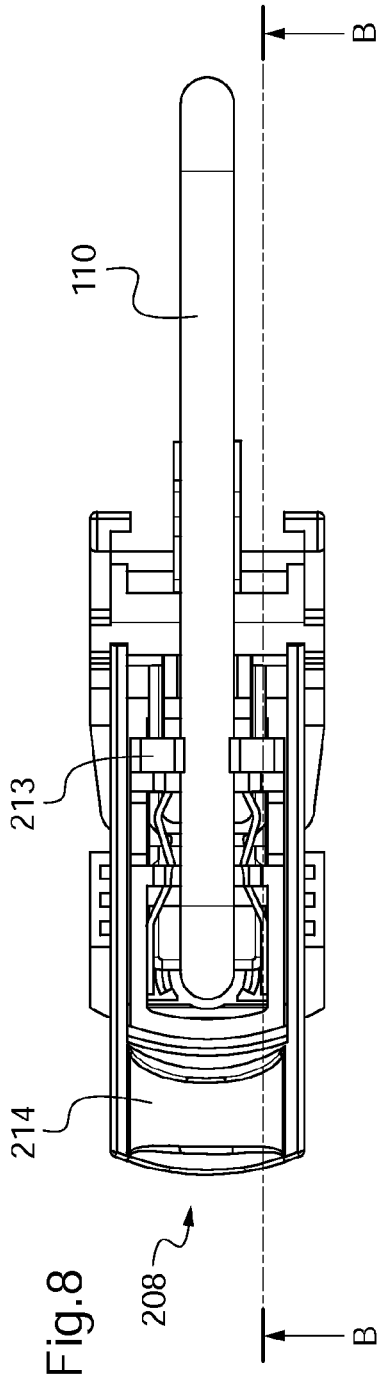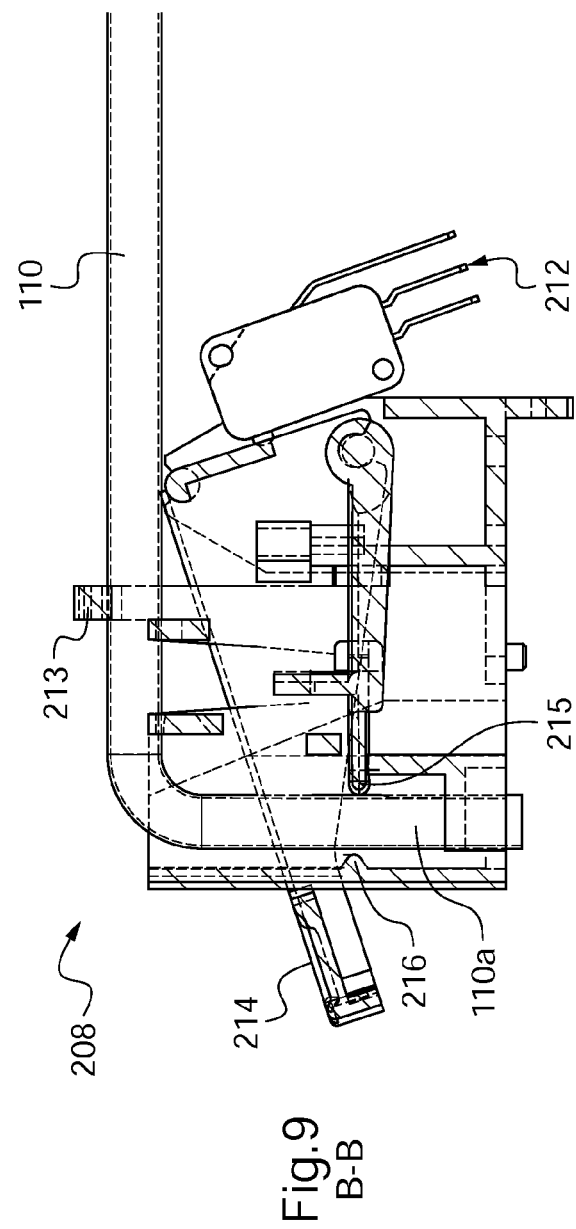

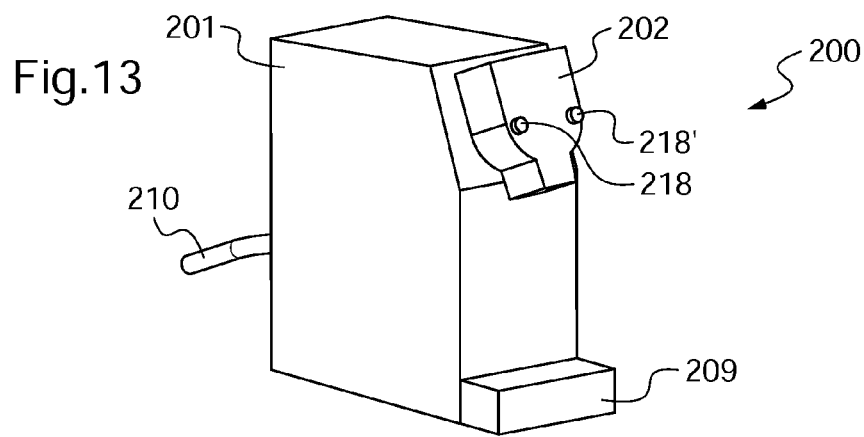
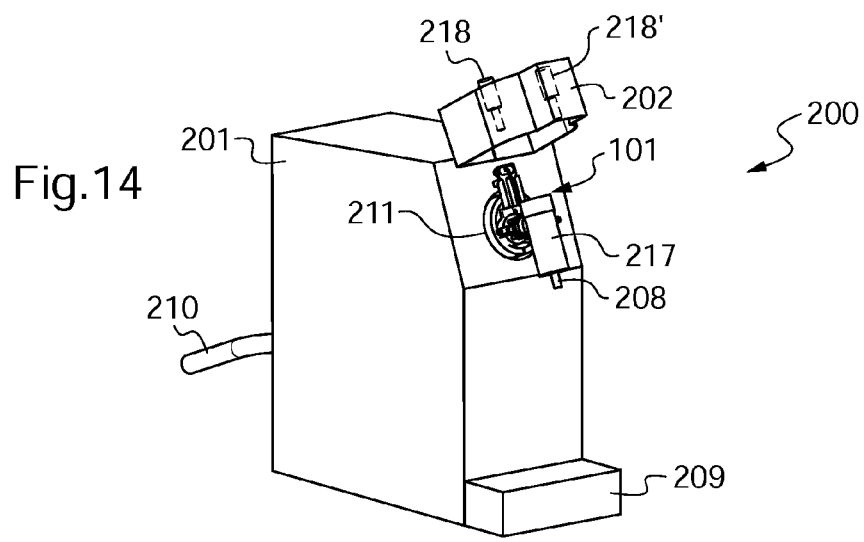
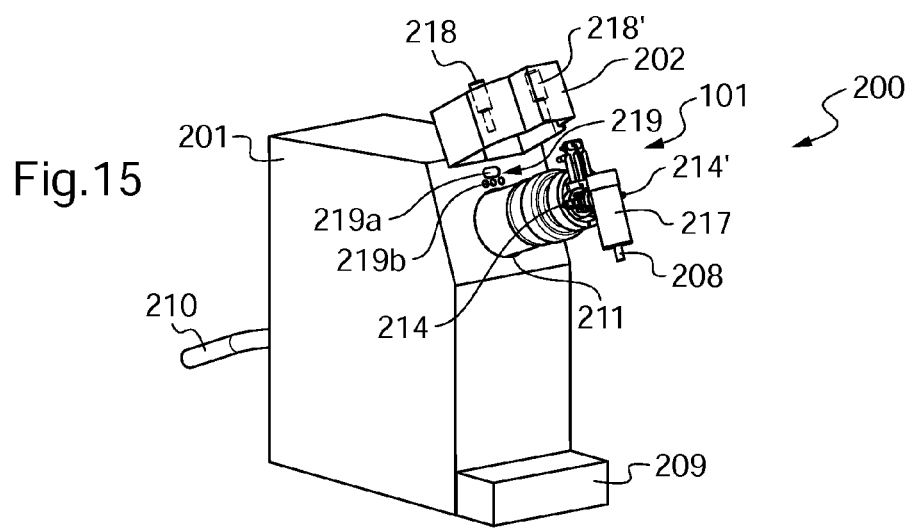

TANK WITH AN INTEGRAL FILTER AND BEVERAGE DISPENSING APPLIANCE COMPRISING SUCH A TANK

FIELD OF THE INVENTION

The present invention relates to a tank for a beverage dispensing appliance such as a water dispenser, as well as to a beverage dispensing appliance comprising such a tank.

BACKGROUND OF THE INVENTION

Water dispensing appliances exist that are suitable for connection to a water supply system. In such a configuration, it is then necessary to purify the water for health reasons, generally by means of filters, so that it is chlorine-free, in particular in order to be potable. Document WO 2012/136915 is known for example, which describes an appliance connected to a water supply system. The appliance described comprises a fixed circuit comprising a first pipe, a coiled portion of which is immersed in a cooling water tank in order to be chilled, purification means and a dispensing network downstream of the purification means. Consequently, to ensure cleaning of the dispensing network, the appliance also comprises a by-pass which shortcuts the purification means in order to allow the dispensing network to be rinsed out. The purification means comprise activated carbon filters which need to be replaced regularly. Since furthermore the circuit as a whole is fixed, it is difficult to gain access to the different elements in order to clean each independently if necessary, and replacement of the purification means requires a lengthy, complex and detailed intervention, involving among other things, partial disassembly of the appliance.

Furthermore, beverage dispensing appliances exist that are supplied by a large-capacity bottle. One of the advantages when using water in a large-capacity bottle is that it is dispensed into the dispensing appliance under completely hygienic conditions. It does not require treatment to remove chlorine for example in order to be potable. Once the large-capacity bottle is empty, it must be replaced, which is generally an unpleasant operation because a full large-capacity water bottle is very heavy, leaving aside the risk of running out of supplies of large-capacity bottles. However, for an appliance intended to distribute water at a temperature other than room temperature for example, water from the large-capacity bottle is temporarily stored in a tank before being delivered via a tap into a receptacle for example for drinking.

Document EP 0 905 084 is known for example which describes a beverage dispensing appliance supplied by a large-capacity bottle. On leaving the large-capacity bottle, water is temporarily stored in a removable tank comprising an upper compartment for water at room temperature and a lower compartment for chilled water. To this end, the lower compartment is surrounded by a cooling circuit. The cold water is routed to a tap via a first pipe and the warm water is routed to another tap via a second pipe. In order to avoid the entry of dust or other contaminants, the appliance comprises moreover a filter at the level of an air inlet in the removable tank allowing air to enter the large-capacity bottle when water drains out. It is therefore necessary to change the filters regularly, which is generally a lengthy and complicated operation requiring at least partial disassembly of the appliance. Independently, it is preferable to clean, or even occasionally change the tank and/or the pipes for reasons of cleanliness. Each time an element is removed or changed, it is then necessary to open the appliance, separate the different components from it, remove (for cleaning) or replace the element in question, then reconnect the assembly with the cleaned or replaced element. For example, when it is necessary to change the tank, it must be detached from the pipes and from the inlet filter, then a new tank must be attached to the filter and pipes. This type of operation also requires partial disassembly of the appliance and necessitates numerous checks for example to ensure the tightness of the assembly.

SUMMARY OF THE INVENTION

The present invention aims to at least partially remedy the abovementioned defects, and to propose a tank allowing replacement of the dispensing water circuit easily and rapidly under completely hygienic conditions.

To this end there is proposed a removable tank for a beverage dispensing appliance, in particular suitable for connecting to a water supply system, the tank comprising at least one storage chamber, a first opening forming an inlet, and a second opening forming an outlet suitable for attachment to a tap for dispensing water, characterized in that the tank comprises moreover at least one water filtration means fluidically connected to the second opening of the tank downstream of the storage chamber.

According to an example embodiment, the first opening forms an inlet of the tank, and the second opening forms a first outlet of the tank, for example for drawing water from the first chamber.

It is then possible to filter the water after storage in the tank, since one of the drawbacks with devices according to the prior art is that the water is filtered before storage, and as a result, there is no chlorine in the tank, even in the case of an appliance attached to a water supply system, to protect the water and contribute towards preventing possible contamination in the circuit. Thus, the water filtration means fluidically connected to the second opening is advantageously a filtration means intended to retain the chlorine present in the water stored in the tank.

Furthermore, all the elements in contact with the water are thus contiguous in order to ensure improved hygiene and facilitate the replacement of the filters and of the tank without the need for disassembly and reassembly of the entire device.

By chamber is meant here that the tank comprises an area for storing water at a certain temperature.

According to an embodiment, the tank comprises moreover a second storage chamber. It also advantageously comprises optionally at least one filtration means fluidically connected to a third opening forming a second outlet.

A second chamber thus makes it possible for example to store water in the tank at a second temperature. For example, the second chamber is situated above the first chamber, and the second temperature is then greater than the first temperature. In other words, the chamber positioned at the top of the tank preferably stores water that is hotter than the water stored in the chamber situated at the bottom of the tank. For example, the first chamber stores cold water, i.e. around 5-10° C. (degrees Celsius), and the second chamber stores warm water, i.e. around 10-15° C. typically. According to another example, the tank can also store warm water at the bottom (in the first chamber) and hot water at the top (in the second chamber). Alternatively, the tank can even comprise more than two chambers in order to be able to for example store simultaneously cold water (at the bottom) warm water (in the middle) and hot water (at the top). The tank then optionally comprises a narrowing of the cross section between two consecutive chambers in order to minimize possible thermal exchanges between water volumes contained in each of the chambers. Such a tank has for example the shape of a coil.

The tank then advantageously comprises one outlet per chamber, with if necessary an internal pipe making it possible to draw water from the corresponding chamber. For example, at least one internal pipe is attached to the second opening, which then forms for example the first outlet and opens out at the base of the tank in order to draw water from the chamber situated at the bottom of the tank, i.e. for example the first chamber.

Optionally, the filtration means fluidically connected to the second opening is situated within a body of the tank.

Situating the filtration means inside the tank makes the tank more ergonomic owing to the fact that protrusion of any element is minimized. Moreover, the tank is thus better protected from possible contamination and the filter is protected from external elements.

For example, in a configuration according to which the filtration means fluidically connected to the second opening is present inside the tank, the internal pipe is then connected below the filter in order to be attached to the second opening.

Furthermore, if the tank comprises a third opening forming a second outlet for a second chamber, optionally also equipped with a filter, the filtration means fluidically connected to the third opening is for example situated within a body of the tank. Similarly, if necessary, the third opening has an internal pipe, optionally attached below the corresponding filter if the latter is situated in the tank.

According to a preferred embodiment, each opening forming an outlet is equipped with a filter, or an internal pipe or both. That is to say for example at least the second opening, or even the third opening.

For example, the first opening is fluidically connected to at least one filtration means.

According to a beneficial embodiment, the first opening comprises a quick-release coupling making it possible to install the tank in a water dispensing appliance without the need for special tools. The first opening then forming an inlet makes it possible to supply the tank with beverage, for example using a large-capacity bottle or via a water supply system.

Optionally, the filtration means fluidically connected to the first opening is situated within a body of the tank.

Thus, positioning at least one of the filters in the body of the tank, or even of all the filters present, makes it possible, among other things, to protect the filter(s) during handling of the tank.

According to a preferred embodiment, each filter comprises a container defining a housing, at least one filtration means (active elements) to be inserted into the container, and a membrane forming a base of the housing.

The container can have any shape whatsoever. However, a container in the form of a rectilinear cylinder with a circular cross section is most convenient.

The membrane makes it possible to filter any residual particles. It is for example constituted by a mesh, for example of fabric stretched over a plastic ring, or a plastic component comprising holes of a few microns in order to be able to filter very fine particles.

The filtration means are of any type of filter media. Preferably, if the inlet is equipped with a filter, the filtration means at the inlet make it possible in particular to retain chlorine in the tank (i.e. the filter media of the inlet filter allow the chlorine to pass through) in order to limit risks of contamination of the tank by bacteria, while each of the outlet filters present preferably comprise at least one filtration means making it possible to absorb the chlorine in order to deliver chlorine-free potable water. A filtration means fluidically connected to a water outlet comprises for example a particle filter and carbon in powder or granular form. A compressed carbon filter, a known as a "carbon block", can also perform mechanical filtration.

It is also possible to add a mechanical filter which blocks bacteria, known as a microbiological filter, with a mesh between 0.05 and 0.25 µm, preferably 0.15 µm.

According to an embodiment, the filtration means fluidically connected to the second opening comprises at least activated carbon, optionally combined with a microbiological filter. Similarly, if necessary, the filtration means fluidically connected to the third opening comprises at least activated carbon, optionally combined with a microbiological filter.

Independently, or jointly, the filtration means fluidically connected to the first opening comprises filtration means for filtering the particles and sediments to remove the fine particles from the water, which are for example a mechanical filter for retaining sediments and/or particles, and/or a filtering resin and/or silver salts (in order to remove bacteria), or a combination thereof. The resin is optionally silver-loaded for example.

Different combinations are of course possible.

Activated carbon makes it possible to absorb chlorine. Optionally, filtration is carried out over the activated carbon to remove materials affecting the taste and odour, and micropollutants. It is preferable to filter the fine particles at an inlet. Thus, the particle filter attached to the inlet is optionally accompanied by a resin for removing limescale, known to a person skilled in the art.

Optionally, a non-return valve is attached to an opening.

The non-return valve is for example positioned after a filtration means with respect to the opening, or i.e. on the side opposite to the opening with respect to a corresponding filtration means, limiting for example contact between the filtration means and the water of the tank when of the water is not being drawn.

According to an embodiment, a non-return valve is attached to the opening, forming the inlet. The water contained in the tank is thus in particular prevented from backing up in a water intake pipe.

According to another embodiment, a non-return valve is attached to the second opening forming a first outlet, or even another non-return valve is attached to the third opening if the tank comprises other outlets.

The presence of non-return valves at the level of the outlet, or outlets if the tank comprises several, ensures in particular that the filtration means of an outlet is not immersed in the water contained in the tank in a configuration in which the water level in the tank immerses at least a part of the filters. In fact, in this case, the valve(s) make it possible to limit the risk of absorption of the chlorine contained in the tank, so as to limit the possible contamination for example, or to ensure that the filtration means are not subject to unnecessary wear.

Each non-return valve can be of any possible type, such as for example a membrane or other, clapper valve, guided valve or ball valve for example.

According to a particularly useful embodiment, the first opening, the second opening, and a container of the filter for housing therein at least one filtration means communicating with the second opening form a unit.

By unit is meant here that at least the first opening, the second opening and the container of the filter communicating with the second opening form an assembly firmly fixed together, for example by bonding, welding, snap connectors or even by a single-piece moulding, such that it is not possible to separate them without damaging or even destroying the unit, or such that it is not possible to disassemble the unit, meaning that if it is disassembled it is impossible to reassemble so that it is operational.

It is then easy to replace the entire circuit comprising the filters, without the need to disassemble the assembly, thus allowing time to be saved on intervention. For example, if such a tank is installed on a water dispenser in a private home, it is not possible to have a service operative clean the circuit or replace the filter. Furthermore it is difficult for a private individual to carry out a cleaning procedure himself. A tank according to the invention thus allows easy removal of the tank and of the main elements of the beverage dispensing circuit.

For example, the unit comprises a platform having on an upper face at least the first opening and the second opening, and on a lower face at least the filter container communicating with the second opening, for example via a hole formed in the platform which faces both the second opening and the corresponding filter container. The filter container is then for example inserted into a neck of the tank.

According to a preferred embodiment, the platform, the first opening, the second opening and the container are moulded in a single piece, for example of plastic material.

The platform forms for example a lid of the tank.

According to a particularly convenient embodiment, the unit, and preferably the platform, is fixed to, or even forms a single piece with, a neck of the tank, or for example a rim of the neck of the tank, optionally sealed. By "fixed" is meant that the unit is for example irreversibly welded, bonded, snap-connected, or even for example attached by thermowelding.

All the elements in contact with water are thus fixed together in order to ensure improved hygiene and further facilitate the replacement of the filters and the tank without the need for disassembly and reassembly of the entire device. It is moreover possible in this way to remove the need to carry out descaling and/or removal of bacteria by introducing chemical products into the circuit, to be followed by flushing with fresh water, which is a lengthy and tiresome operation. Thus a monobloc tank is formed with an integral filter, making it possible to change the hydraulic circuit of a beverage dispensing appliance in a particularly quick and convenient fashion.

According to an embodiment envisaged, the unit comprises moreover the third opening, or even more openings. And optionally, each of the openings corresponds to a housing for a corresponding filter. Each filter container is for example situated on a lower face of the platform while each opening is situated on an upper face of the platform, which makes it possible for example to situate all the filters in the body of the tank if this option is desired.

For convenience, the tank comprises moreover for example at least one tap. The tap is for example connected to the second opening. By tap is meant here a beverage dispensing means.

The tank thus comprises the entire dispensing circuit, that it is then possible to change with a minimum of disassembly.

Optionally, the tank comprises a UV sterilizer connected to the tap, which makes it possible to reinforce the hygiene measures in addition to the various filters. In particular, owing to the fact that one end of the tap is in contact with ambient air, bacteria could gain access to the tank by this means, or at least contaminate the tap. Such a sterilizer mounted for example directly on the tap makes it possible to limit this type of risk.

According to yet another embodiment, the tank comprises a first dispensing pipe connecting the second opening for example, to a tap. The tap is for example directly pre-fixed on the tank or is a water dispenser tap.

It is thus possible to be able to change a major part of the circuit in a single operation for machine maintenance. Such an operation is thus quicker, more hygienic and allows the risk of errors of assembly or disassembly to be reduced for example, and consequently reduced risk of wear, damage or breakage of certain elements.

Thus, for example, at least a part or even all the elements are optionally fixed together, for example by irreversible bonding, welding, or even snap-connecting, so that once assembled, any attempt to disassemble them would result in deterioration that would make the assembly inoperable, non-functional and ineffective.

More generally, if the question of hygiene does not arise, according to another aspect of the invention a tank is also proposed equipped with a filter that could be positioned either at the inlet or at the outlet, thus forming an easily replaceable kit.

The present invention also relates to a beverage dispensing appliance, in particular suitable for connecting onto a water supply system, comprising an enclosure, a water intake intended to be attached to a water intake pipe of the water supply system, and at least one tap for dispensing water, characterized in that it comprises a removable tank as defined previously, the storage chamber of which is situated at least partially in the enclosure.

Such a tank optionally has all or part of the features previously disclosed, giving it similar advantages.

Such an appliance thus allows the tank to be easily and quickly exchanged, i.e. replacement of a major part or even the entire water dispensing circuit for maintenance of the machine.

The appliance moreover conventionally comprises a water intake, or for any other beverage, for connecting thereto for example a large-capacity bottle or a water supply system.

According to a useful embodiment, the appliance is intended to be connected to a water supply system. The opening is then for example connected to a water intake of the appliance and the appliance comprises a pressure shut-off solenoid valve situated between the first opening of the tank and the water intake of the appliance.

The presence of such a solenoid valve makes it possible to dispense with a buffer tank to relieve the pressure, while avoiding the tank being permanently subject to the pressure of the water supply system. In fact, a buffer tank makes it possible generally to isolate the tank from the water pressure of the supply. With such a solenoid valve, the tank, and more generally the entire water dispensing circuit of the appliance, is kept isolated from the pressure of the water supply system without the need to use a buffer tank. It is moreover preferable to dispense with a buffer tank for reasons of hygiene and to limit the number of elements of the water circuit of the appliance to be cleaned or changed regularly.

In addition, the appliance advantageously also comprises a pressure regulator upstream of the solenoid valve.

Such a pressure regulator is for example positioned between the water intake and the solenoid valve. A pressure regulator makes it possible in particular to reduce the water pressure from the water supply system and keep it constant.

According to another beneficial feature, the appliance comprises a tap equipped with an actuator provided with a button and electrical microcontacts for actuating the solenoid valve.

It is thus possible to choose to fill the tank with water from the water supply system.

Such an actuator has for example three positions. An off position in which a corresponding dispensing pipe is constricted, no water flows in the appliance nor exits from it to fill a cup for example. A first service position, in which the button is pressed until reaching a first position making it possible to release a flow in the corresponding dispensing pipe, i.e. to release the constriction. In this position, the tank empties in order to dispense water, to fill a cup for example. And a second service position in which the button is pressed until reaching a second position making it possible not only to release the flow in the corresponding dispensing pipe but in addition to open the solenoid valve, making it possible to simultaneously fill the tank as it empties in order to dispense water, fill a cup for example. In the off position, the solenoid valve is therefore for example closed so that the entire circuit is not subject to a constant water feed from the water supply system.

Thus, an aspect of the invention that can be regarded as original per se is a beverage dispensing appliance to be plugged into a water supply system comprising a water intake intended to be attached to a water intake pipe of the water supply system, and at least one tap for dispensing water, the appliance comprising moreover a pressure shut-off solenoid valve situated between an inlet of a tank and the water intake, optionally a pressure regulator upstream of the solenoid valve, and an actuator equipped with a button and electrical microcontacts for actuating the solenoid valve suitable for adopting an off position in which the water dispensing circuit is blocked (the solenoid valve is closed), a first service position in which the tank empties to dispense water (the solenoid valve being also closed) and a second service position in which the tank empties to dispense water and the solenoid valve is open to fill the tank with water from the water supply system.

Such an appliance comprises moreover optionally a removable tank as described previously, with all or part of the features mentioned, resulting in similar advantages.

BRIEF DESCRIPTION OF THE DESCRIPTION

The invention according to an embodiment, will be well understood and its advantages will become more apparent on reading the following detailed description, given indicatively and non-limitatively with reference to the attached drawings in which:

FIG. 1 shows a transparent perspective view of a tank according to a first embodiment of the present invention, FIG. 2 shows a transparent side view of the tank in FIG. 1, FIG. 3 shows an exploded view of the tank in FIG. 1.

Figure 4:
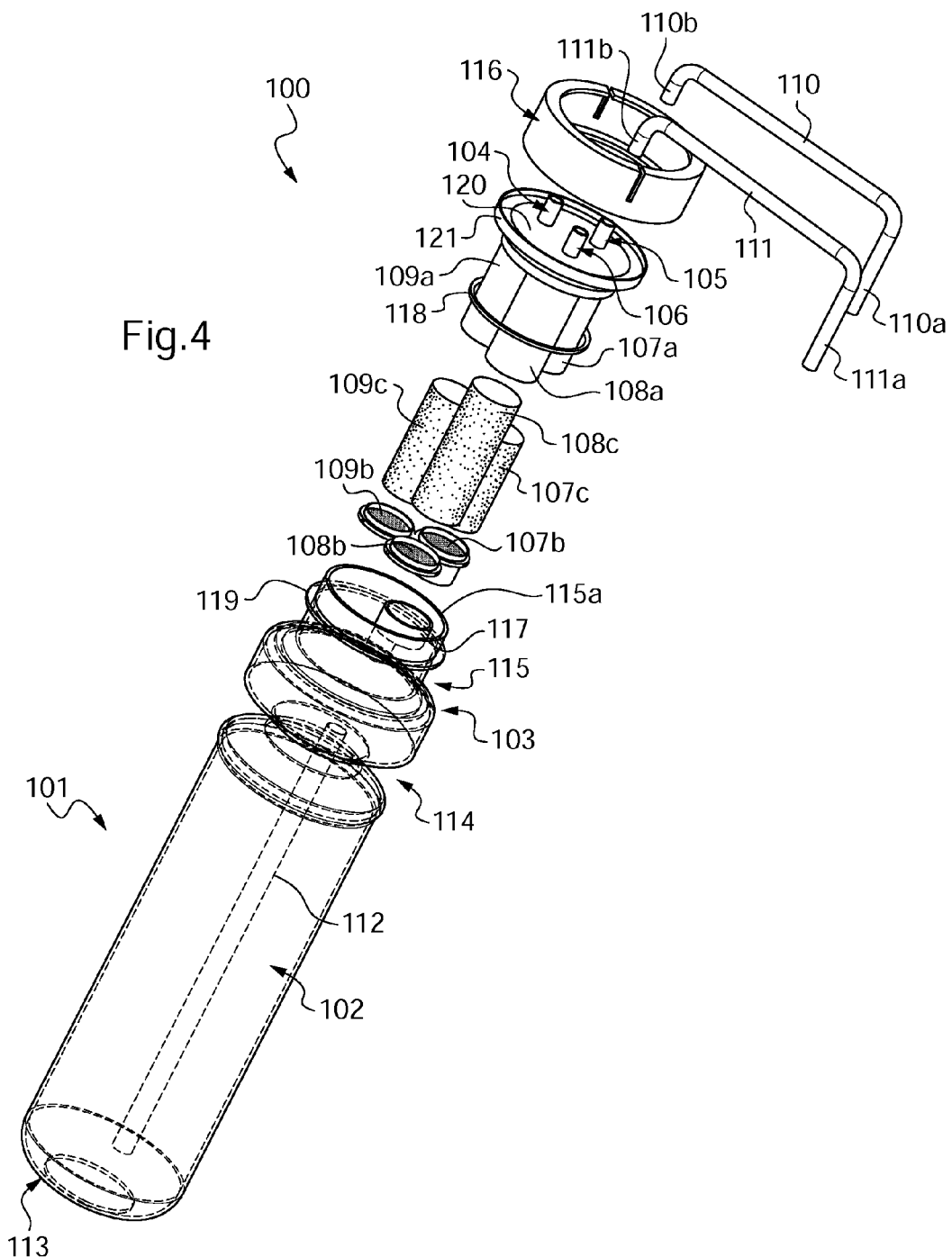
FIG. 4 shows another exploded view of the tank in FIG. 1.
Figure 5:
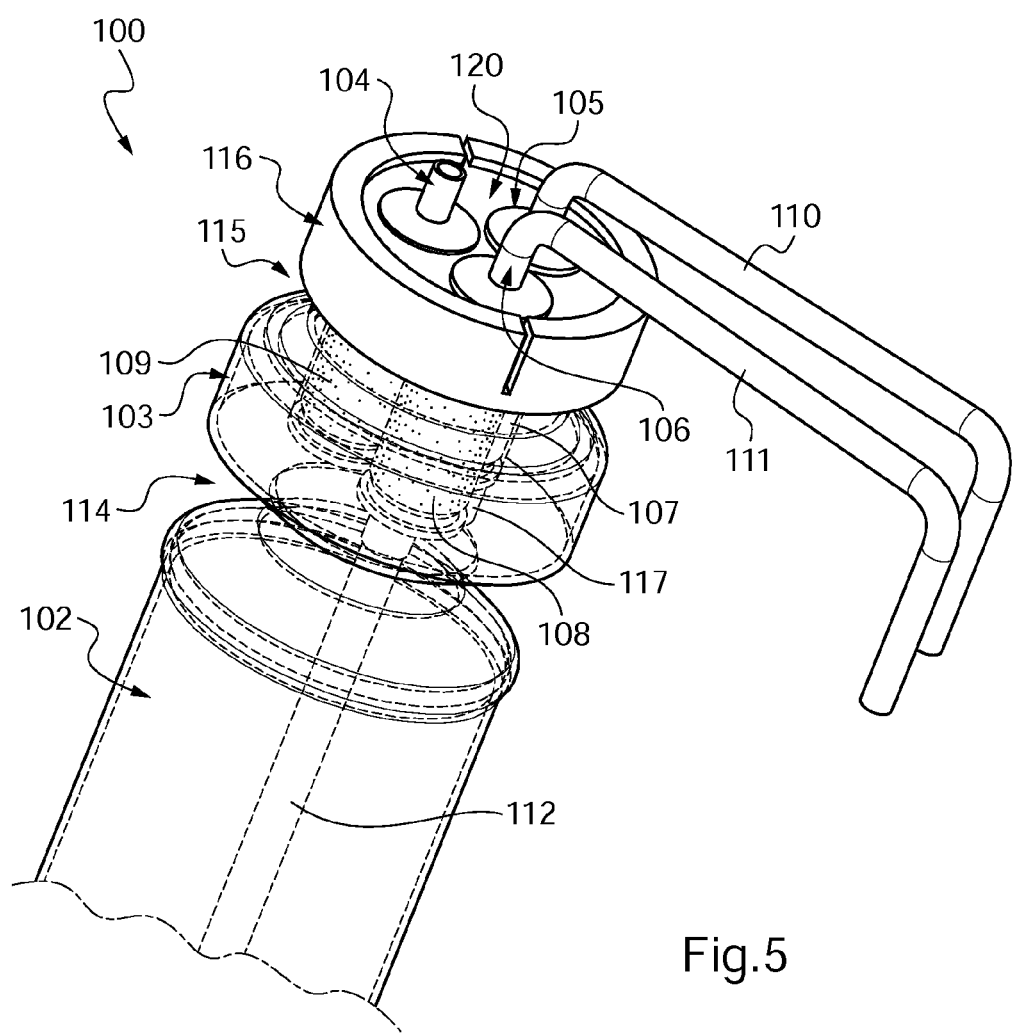
FIG. 5 shows a transparent detail view of an upper part of the tank of FIG. 1.
Figure 10:
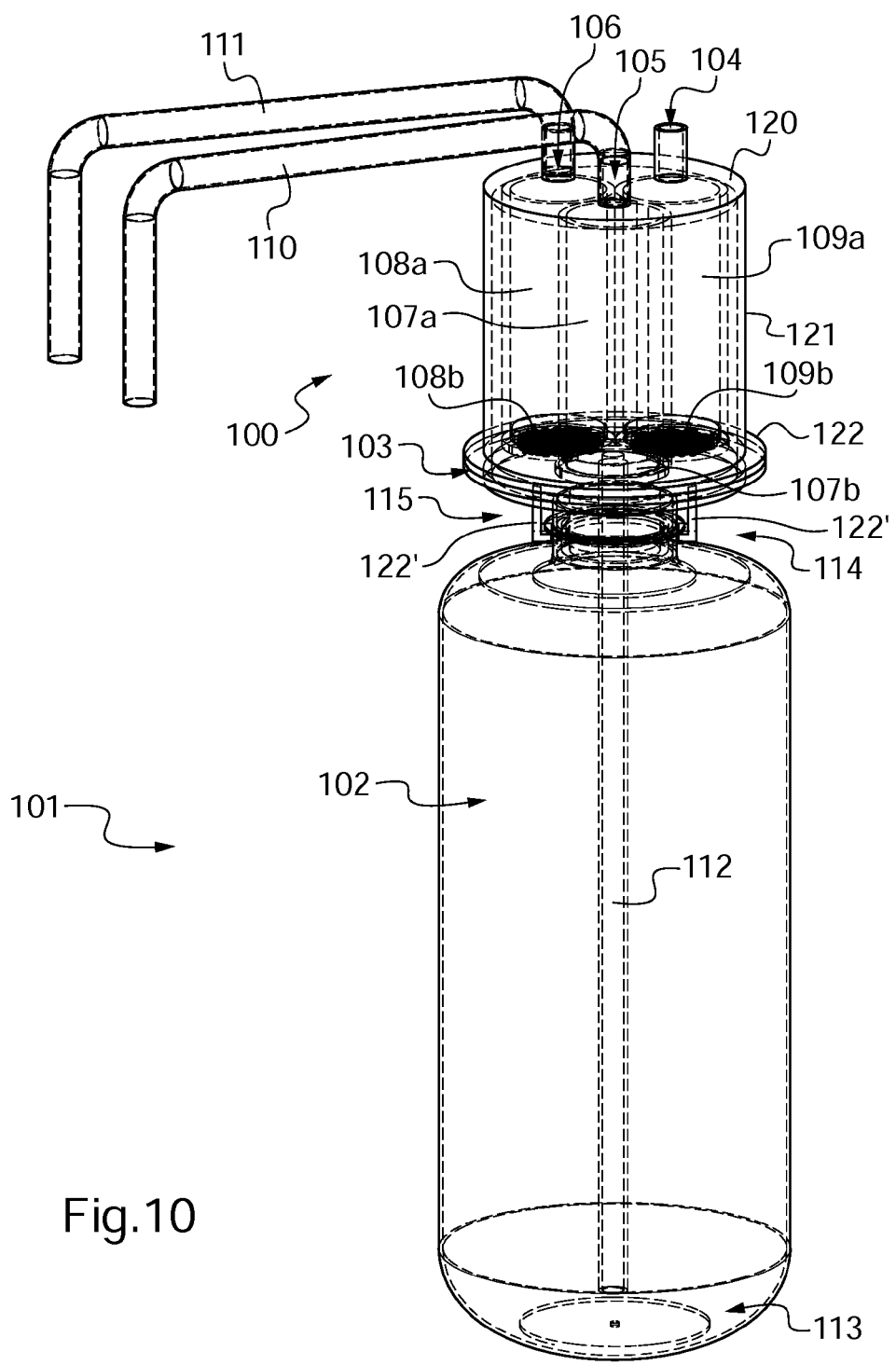
Figure 11:
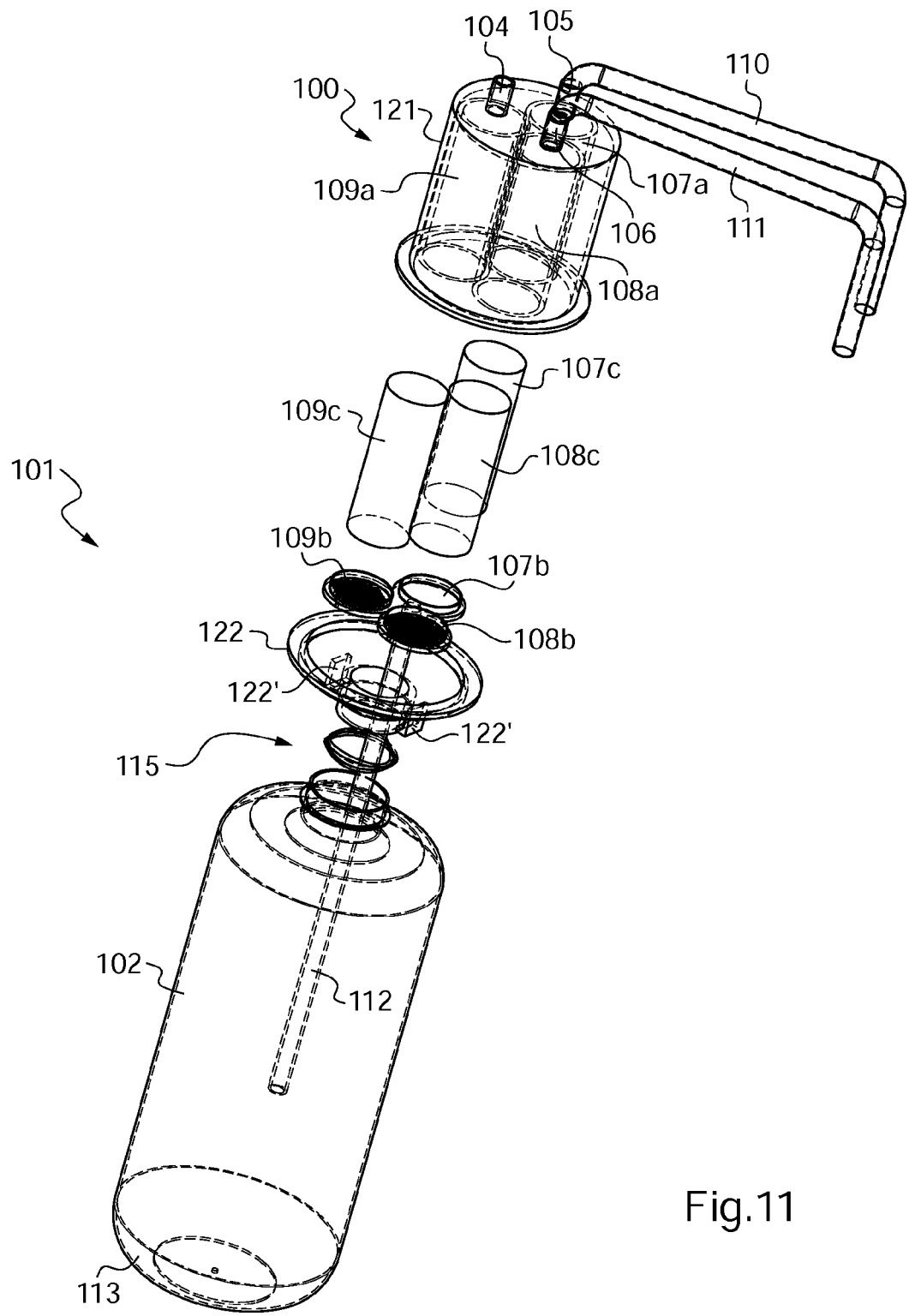
Figure 12:
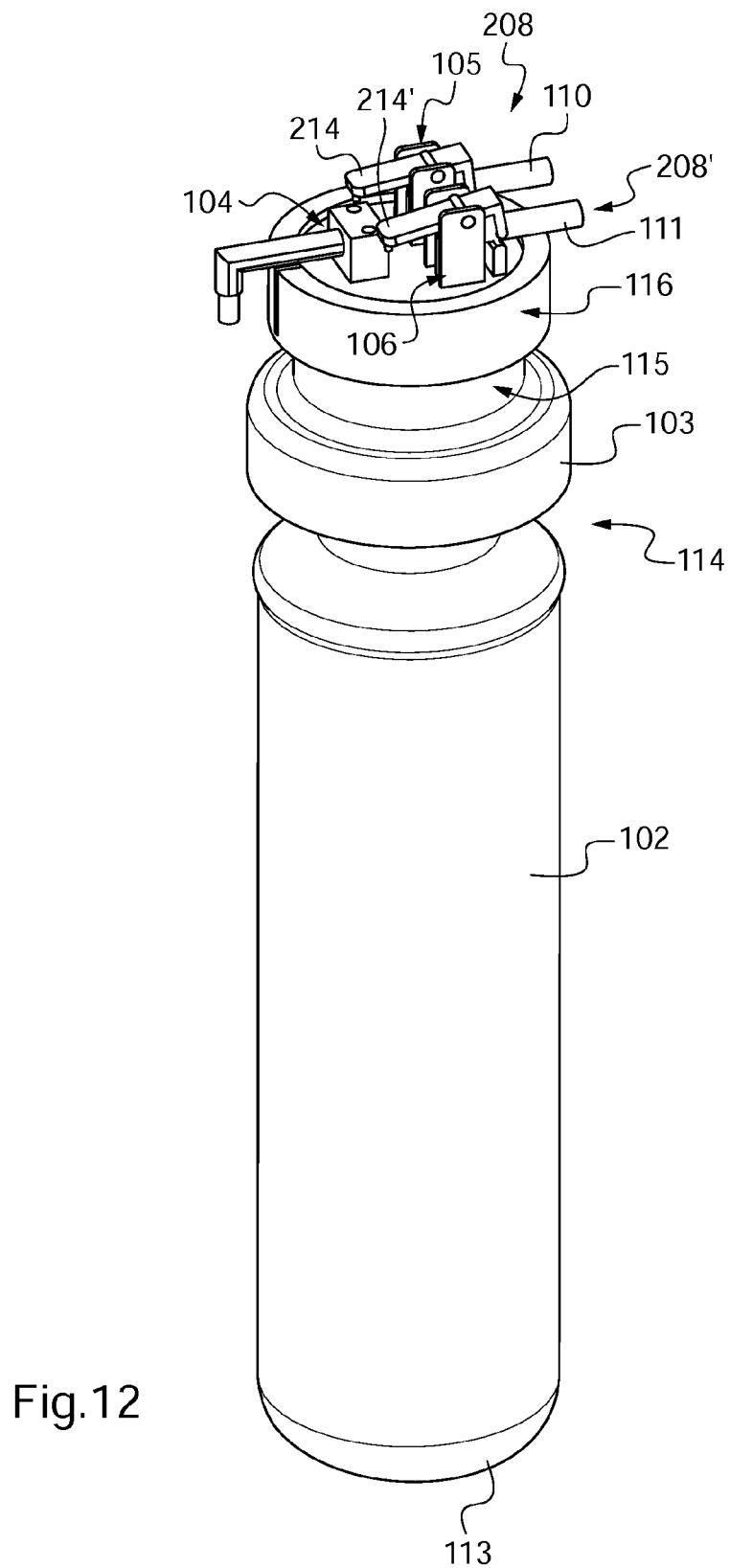
Figure 16:
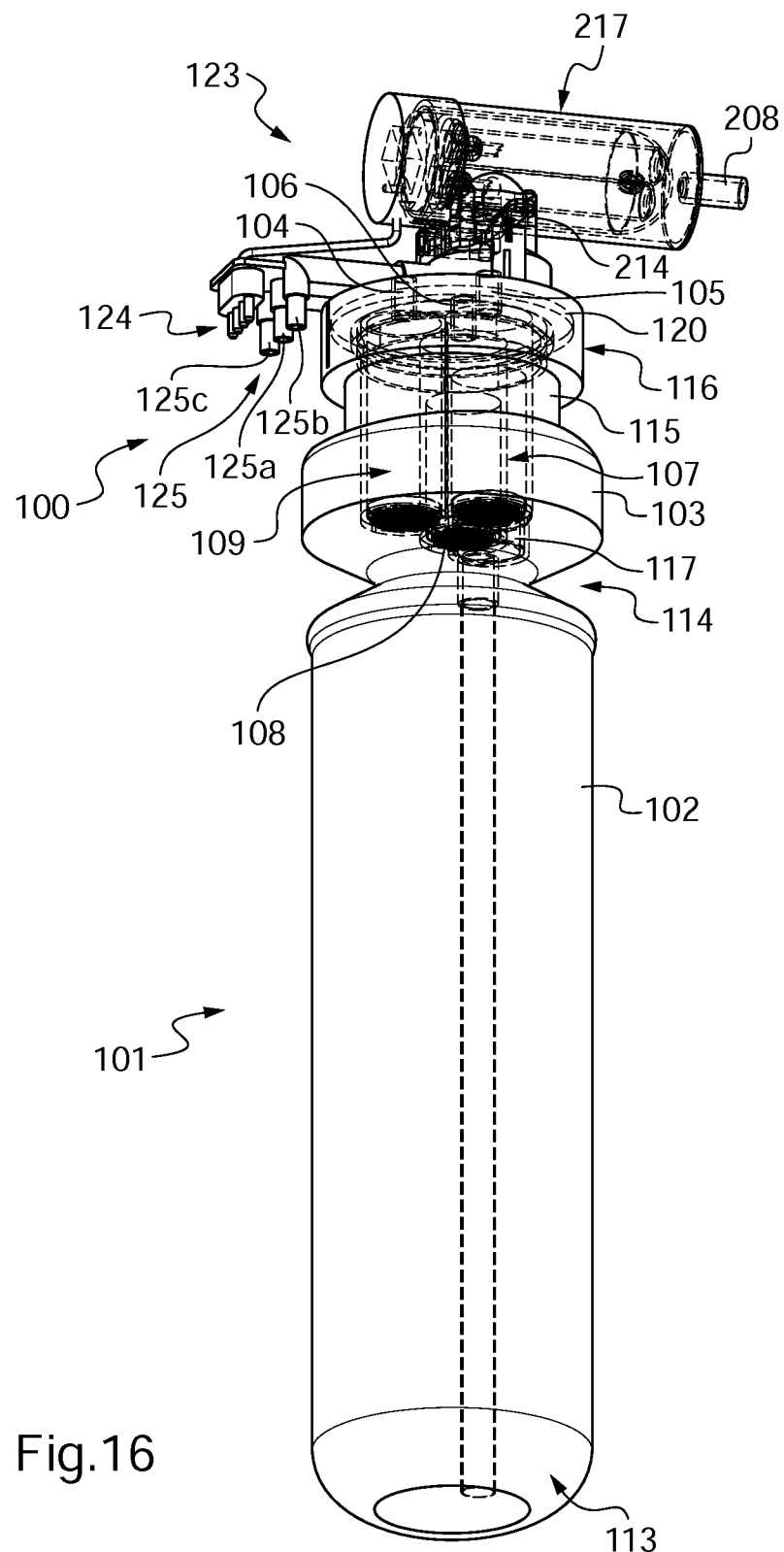
Figure 17:
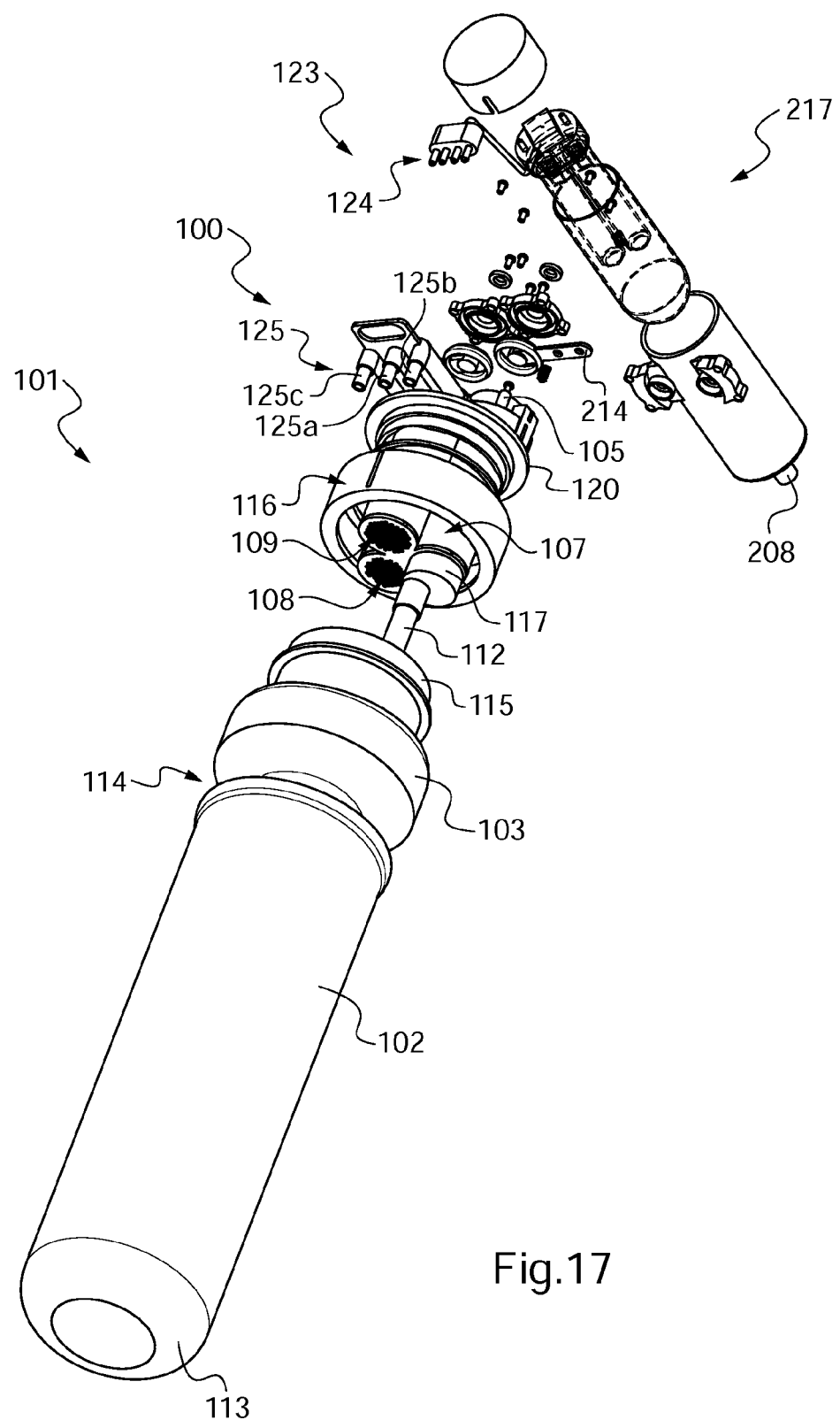
Figure 18:
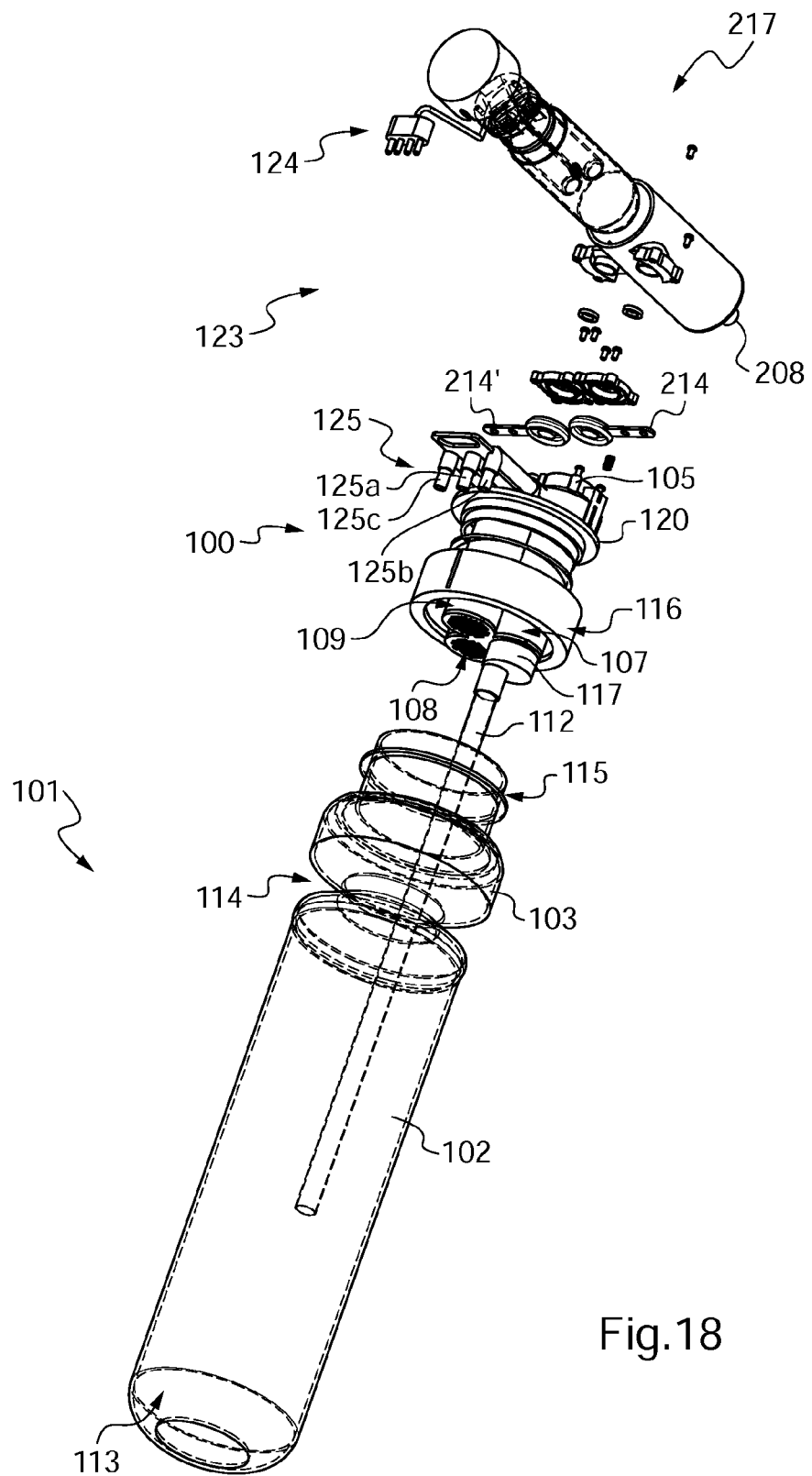
Figure 19:
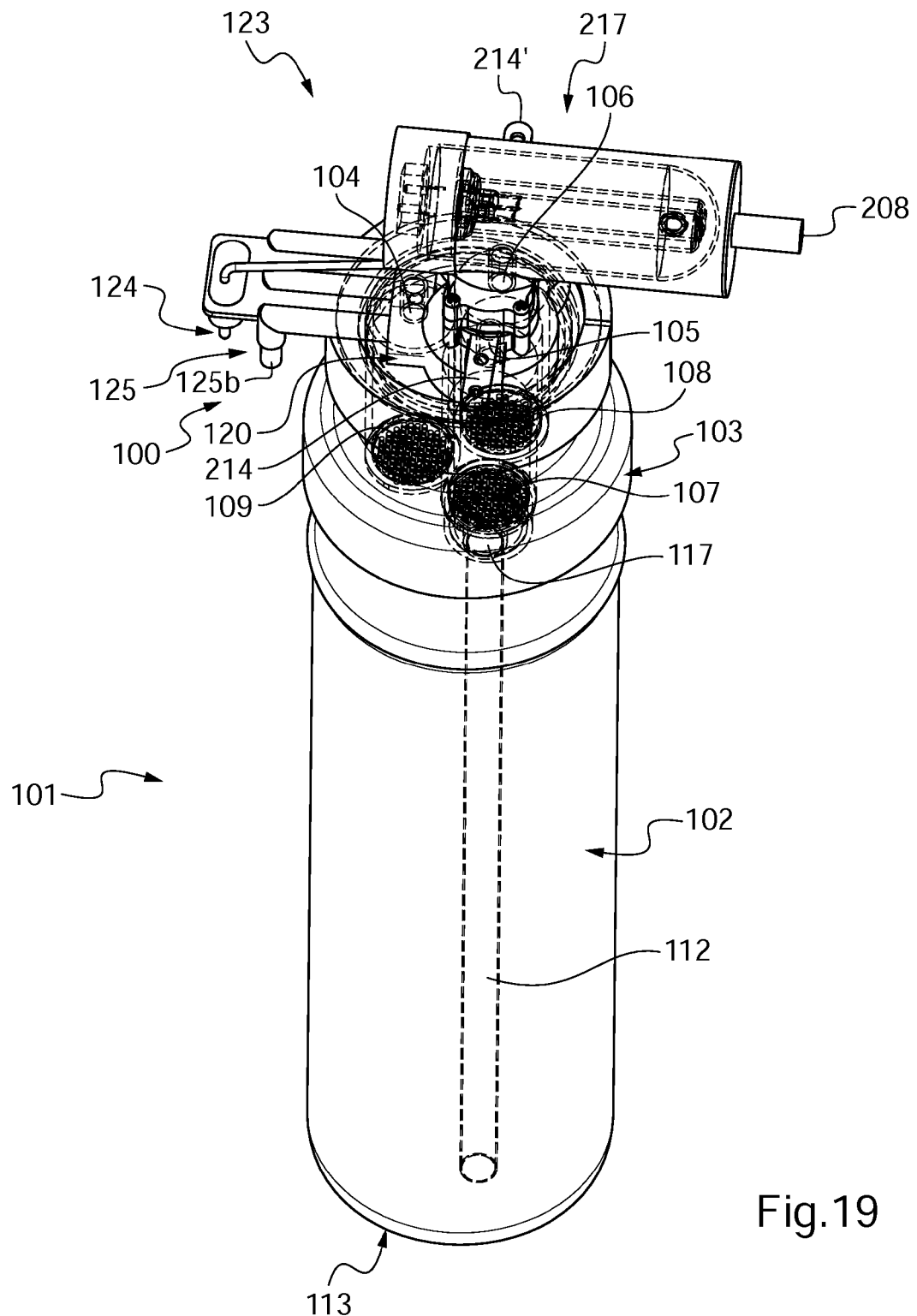

FIG. 6 shows diagrammatically a perspective view of a beverage dispensing appliance according to a first embodiment of the present invention, comprising a removable tank as shown in FIG. 1, FIG. 7 shows diagrammatically a side view of the beverage dispensing appliance in FIG. 6, FIG. 8 shows a top view of an actuator according to an embodiment, FIG. 9 shows a cross section of the actuator in FIG. 8, FIG. 10 shows a tank according to a second embodiment of the present invention;

FIG. 11 shows an exploded view of the tank in FIG. 10;

FIG. 12 shows a tank according to a third embodiment of the present invention,

FIGS. 13, 14 and 15 show a dispensing appliance according to a second embodiment, FIG. 16 shows a tank according to a fourth embodiment of the present invention, FIG. 17 shows an exploded view of the tank in FIG. 16;

FIG. 18 shows a transparent exploded view of the tank in FIG. 16,

FIG. 19 shows a transparent view of the tank in FIG. 16, and

Figure 20:
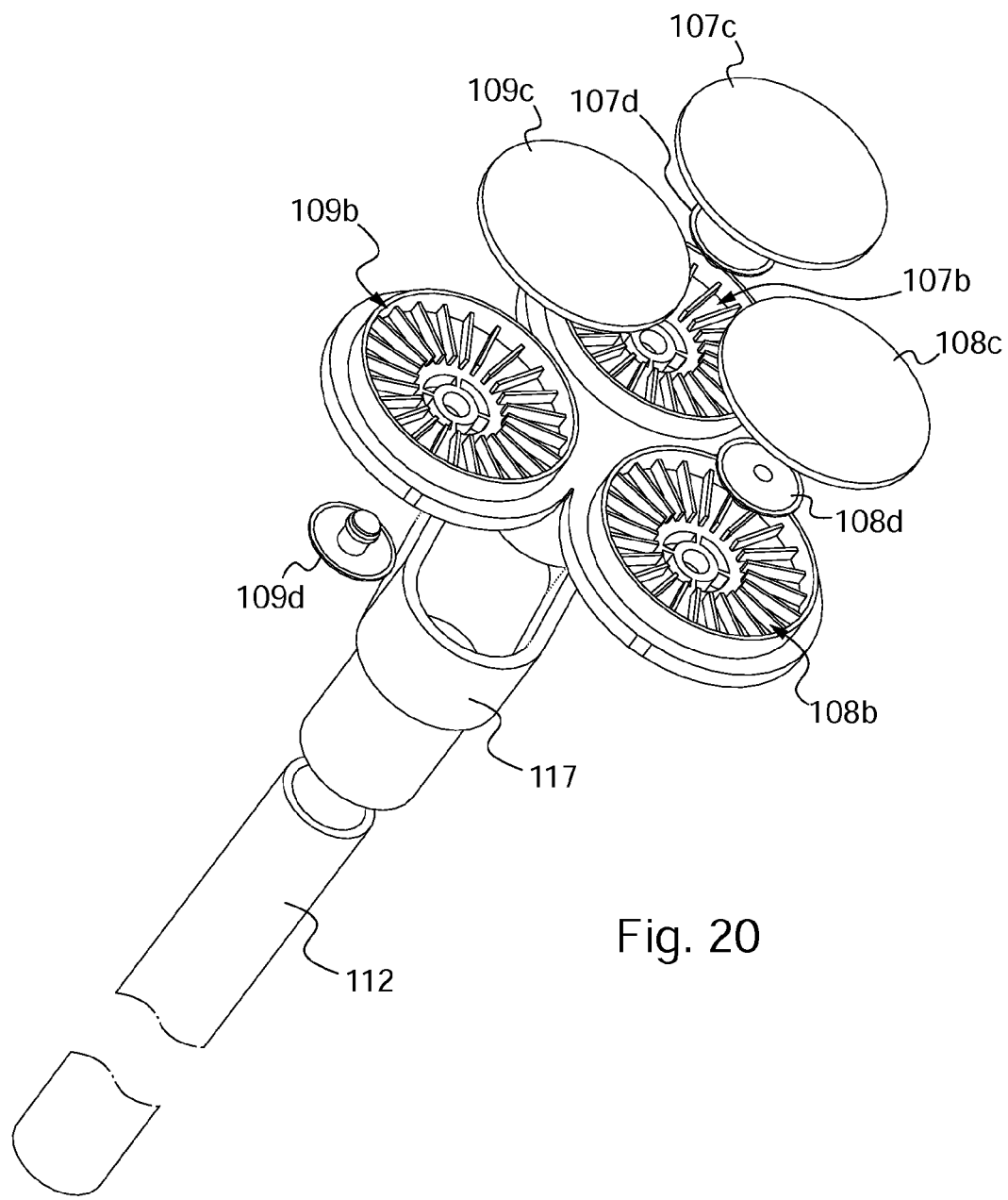

FIG. 20 shows the presence of a non-return valve.

Identical elements shown in FIGS. 1 to 20 are identified by identical numerical references.

DETAILED DESCRIPTION OF THE INVENTION

According to the invention, a tank 101 comprises a first storage chamber 102, a first opening 104, here forming an inlet, and a second opening 105, here forming a first outlet for drawing a beverage from the first chamber 102.

A first water dispensing pipe 110 is connected to the second opening 105 of the tank outside the body of the tank, and the tank comprises moreover a filter 107 attached to the second opening 105 of the tank 101 while here being situated inside the body of the tank 101.

According to an optional aspect of the invention, the first opening 104, the second opening 105, and a container 107a of the filter 107 defining a housing for receiving therein at least one filtration means communicating with the second opening 105 here form a unit 100.

In the embodiment of FIGS. 1 to 5, the first opening 104 is equipped with a filter 109 situated inside the body of the tank, and the tank 101 comprises moreover a second chamber 103 and a filter 108 attached to a third opening 106, here forming a second outlet for drawing a beverage from the second chamber 103, and also situated inside the body of the tank 101.

In addition, the removable tank 101 here comprises a second beverage dispensing pipe 111 connected to the third opening 106 of the tank 101 outside the tank 101.

As shown for example in FIG. 2, the second chamber 103 is here positioned above the first chamber 102, within one and the same body of the tank. The second chamber 103 is for example intended to contain water at room temperature, while the first chamber 102 is for example intended to contain chilled water, for example around 5-10° C. In order to limit potential thermal exchanges between the volumes of water contained in the first chamber 102 and the second chamber 103, the first chamber 102 and the second chamber 103 are advantageously separated by a narrowed cross section 114. In addition, it is noted for example that the second chamber 103 (at least the upper chamber) has a dimension (here for example a diameter if the tank has a cylindrical shape overall) that is substantially larger than that of the first chamber 102. This is in particular practical when the tank 101 is inserted into an enclosure 211 of an appliance 200, which is for example a chilled enclosure, also known as refrigeration compartment. In this case, it is beneficial for at least the dimension of the second chamber 103 to allow the second chamber 103 to remain positioned above the enclosure 211 (as shown for example in FIG. 6) while all of the first chamber 102 is inserted into the enclosure 211.

The tank 101 here has a shape that is cylindrical overall with a body mainly formed here by a base 113, the first chamber 102, the second chamber 103 optionally, and a neck 115.

In an upper part, the tank 101 comprises the unit 100 which here comprises a platform 120 having on an upper face, the first opening 104, the second opening 105 and the third opening 106, and on a lower face containers 107a, 108a and 109a for the filters 107, 108 and 109. Such an assembly constituted by the platform 120, the first opening 104, the second opening 105, the third opening 106, and containers 107a, 108a and 109a for the filters 107, 108 and 109 is for example moulded in a single piece, for example of plastic, thus forming the unit 100 according to an embodiment. In the present embodiment, the platform 120 has the shape of a disk, optionally surrounded by a flange ring (shown in FIG. 4) which is for example intended to form a sealing gasket by cooperating with a crown 116. In addition, the first opening 104, the second opening 105, the third opening 106, and the containers 107a, 108a and 109a for the filters 107, 108 and 109 here have a rectilinear cylindrical shape with a circular section which is particularly convenient to produce, in particular to mould; the containers 107a, 108a and 109a for the filters 107, 108 and 109 preferably have diameters that are greater (typically from 30 to 60 mm) than those of the first opening 104, of the second opening 105, and of the third opening 106 which typically measure less than 10 mm (millimeters). In addition, the first opening 104, the second opening 105, and the third opening 106 open into the containers 107a, 108a and 109a for the filters 107, 108 and 109 via holes (not shown) formed in the platform 120 so that water, or any beverage, can flow through.

The containers 107a, 108a and 109a for the filters 107, 108 and 109 receive filtration means 107c, 108c and 109c respectively.

The filter 109 of the first opening 104 is for example an inlet filter. It then typically comprises filtration means 109c for filtering sediments and/or particles, and to allow chlorine to pass into the tank 101 in order to guard it against contamination.

The filtration means 107c, 108c of the filter 107 of the second opening 105, forming for example a first outlet, and of the filter 108 of the third opening 106, forming for example a second outlet, typically comprise activated carbon for filtering the chlorine present in the water and prevent its ingestion by a user of the appliance 200. Other filtration means can be added.

In order to hold the filtration means 107c, 108c, 109c in their respective container 107a, 108a, 109a, the containers 107a, 108a, 109a are closed by a membrane 107b, 108b, 109b fixed to a free end of the corresponding container 107a, 108a, 109a, i.e. their end opposite to the openings.

Optionally, as is the case in this example, an internal pipe 112 is fixed to the filter 107 of the second opening 105 using a ring 117. The internal pipe 112 thus forms a sort of straw making it possible to draw the water from the first chamber 102. The internal pipe 112 opens as deep as possible in the tank 101, for example close to the base 113 of the tank 101.

In the present embodiment, it is not necessary to equip the filter 108 of the third opening 106 with a similar internal pipe owning to the fact that a lower end of the filter 108, i.e. here the free end comprising the membrane 108b, reaches close to a lower level of the second chamber 103.

Other configurations can of course be envisaged in which each outlet of the tank, whether or not equipped with a filter, could be equipped with an internal pipe opening as deeply as possible in the corresponding chamber.

In a general case, if the tank comprises several chambers with the same number of outlets each equipped with a filter, it is advantageous for the filter to have a lower end positioned close to a base of the chamber situated the closest to the filters, i.e. the membrane of at least one of the filters is situated at the bottom of the chamber situated highest in the tank so that at least one internal pipe can be dispensed with.

On the basis of the present embodiment, it is noted moreover that the unit 100 formed by the platform 120, the first opening 104, the second opening 105, the third opening 106, and the containers 107a, 108a and 109a for the filters 107, 108 and 109 is symmetrical so that the first opening 104 is identical per se to the second opening 105 and to the third opening 106. This allows in particular quicker assembly because for example, once the first pipe 110 is on any one of the openings (104, 105, 106), and the second pipe 111 on any other opening (104, 105, 106), a third opening (104, 105, 106) then becomes the inlet, and it is easy to insert into the corresponding containers 107a, 108a, 109a the recommended filtration means according to whether the housing communicates with the inlet (here the first opening 104) or the outlets (here the second and third opening 105, 106, i.e. the openings equipped with a pipe 110, 111).

Thus, in order to assemble the tank 101, the unit 100 is for example inserted into the neck 115 of the tank 101.

To this end, a seal 118 is advantageously present and is positioned if necessary in a throat 119 formed in the neck 115. Finally the crown 116 seals the assembly so that it is impossible to disassemble it subsequently without destroying it Optionally, the pipes 110, and 111 if necessary, are for example also sealed, by bonding or welding or other means, to the corresponding openings so that the tank 101 forms a whole that cannot be disassembled, allowing easy insertion into or removal from an appliance as a single unit, so that it is thus possible to change the entire beverage dispensing circuit under completely hygienic conditions.

Apart from the unit 100 at least constituted by the platform 120, the first opening 104, the second opening 105, the third opening 106, and the containers 107a, 108a and 109a for the filters 107, 108 and 109, the different components of the tank 101 are preferably moulded. For example, the tank 101, here formed of the base 113, the first chamber 102, the narrowing 114, the second chamber 103 and the neck 115 is for example blow-moulded like a standard water bottle.

Thus, such a removable tank 101 is particularly convenient to insert into or remove from a beverage dispensing appliance 200.

With reference to FIG. 6, an appliance 200 comprises a body 201 with a lid 202, here in the upper part, making it possible to access the beverage dispensing circuit, in particular for installing or removing a removable tank 101.

The appliance 200 comprises moreover a removable tank 101.

A water intake 203 makes it possible for example to attach the appliance 200 to a water intake pipe of the water supply system 300.

The water tank 101 is here attached to the water intake 203 by means of a pipe 206, a solenoid valve 205 and a pressure regulator 204 positioned in series between the water intake 203 of the appliance and a first opening 104 of the tank 101, forming an inlet.

Advantageously, the first opening 104 is here connected to the pipe 206 using a quick-release coupling 207.

At the outlet, the tank 101 is connected to a tap for dispensing water 208 (comprising for example an actuator an embodiment of which is detailed in FIGS. 8 and 9) by the dispensing pipe 110. In this case, the tank 101 comprising two chambers, a second dispensing pipe 111 is connected to another tap 208', preferably identical to the tap 208.

In the embodiment of FIGS. 6 and 7, the appliance 200 comprises a enclosure 211, for example refrigerated, receiving the first chamber 102 of the tank 101, the second chamber 103 remaining outside the enclosure 211 for containing water at room temperature for example.

Finally, the appliance here comprises moreover a drip tray 209 making it possible in particular to position a receptacle such as a cup to be filled, as well as a drain tube 210 making it possible to drain spilled water for example.

FIGS. 8 and 9 show an embodiment of a tap 208 (a tap 208' being identical).

The tap 208 here comprises an actuator equipped with a button 214 and electrical microcontacts 212 for actuating the solenoid valve 205.

In an off position of the tap 208, a nozzle 110a of the dispensing pipe 110 is constricted between a fixed jaw 216 and a mobile jaw 215.

When a user presses the button 214, it causes the jaws 215 and 216 to separate, releasing a flow of water from the tank.

When the button 214 is in a first service position, the tank empties only.

When the button 214 is in a second service position, pressed further than the first, the solenoid valve is opened by means of activation of the microcontacts 212, making it possible to simultaneously fill the tank 101 while also filling a receptacle.

Thus, in the present embodiment, as the tank 101 comprises two chambers 102, 103, it is advantageous for the appliance to comprise two taps 208 and 208' in order to be able to draw at will cold water from the first chamber 102 or warm water from the second chamber 103 for example.

Thus, the installation and removal of the tank 101 is very simple and makes it possible to ensure satisfactory hygiene in the entire water dispensing circuit as a part of the tap 208 through which the water flows is formed by the nozzle 110a of the pipe 110 (or by the nozzle 111a of the pipe 111 for the tap 208' for example). The pipe 110 is held in position by clamps 213 making it possible to snap-connect the pipe 110 into the actuator of the tap 208. Preferably, the button 214 is simultaneously pressed in order to allow insertion of the nozzle 110a. In parallel, the inlet 104 is easily connected to the water intake 203 for example using the quick-release coupling 207.

The tank 101 thus forms a monobloc unit allowing the dispensing circuit to be changed easily and quickly under completely hygienic conditions.

FIGS. 10 and 11 show a second embodiment of a tank according to the invention. The common elements in the example previously shown are not described again. This second example differs from the first in that the unit 100 is here situated above the neck 115. To this end, the unit 100 also comprises a casing 121, here cylindrical overall with a circular cross section. The casing 121 is closed on the upper part by the platform 120, and comprises a lower part 122 enlarged to form the second chamber 103 and suitable for cooperating with the neck 115, for example to be fixed thereto in a manner that does not allow disassembly by legs 122' allowing the unit 100 to be snap-connected onto the neck 115. Thus, it is noted here that the second chamber 103 is formed by the unit 100 and not by the body of the tank per se as in the previous example. The neck 115 here serves as a narrowing 114 between the first chamber 102 and the second chamber 103. As previously, the platform 120 here has a lower face from which extend the containers 107a, 108a, 109a for the filters, and an upper face from where the openings 104, 105, 106 extend. The containers 107a, 108a, 109a for the filters are thus housed here in the casing 121, above the neck 115. Such a tank is for example intended for an appliance as shown in FIGS. 6 and 7, and the pipes 110, 111 are for example suitable for cooperating with a tap 208, 208' as shown in FIGS. 8 and 9.

FIG. 12 shows a tank according to a third embodiment of the present invention, The common elements in the example shown in FIGS. 1 to 5 are not described again. This embodiment differs for example from that in FIGS. 1 to 5 in that the taps 208, 208' are positioned directly over the openings 105, 106. In this embodiment, the actuator of the tap 208 (or of the tap 208' which is identical thereto) is for example simply constituted by a button 214 (or 214') constricting the pipe 110 (or 111) when it is in the off position. Such an embodiment makes it possible for example to have an extremely compact tank 101. Preferably, the tap 208 (or 208') is mounted on the tank in such a way that it cannot be disassembled, i.e. so that the tank 101 is at least partially damaged if the tap is subjected to attempted disassembly, for example by bonding, snap-connecting or other means. Such tank is for example intended for an appliance similar to that shown in FIGS. 13 to 15.

FIGS. 13, 14 and 15 show a dispensing appliance 200 according to a second embodiment. The common elements in the example previously shown are not described again. Such an appliance makes it possible for the beverage dispensing circuit to be changed easily and quickly. Here, the lid 202 is positioned preferably on the face of the appliance 200. The lid 202 here comprises a switch 218 for activating a button 214 of a tap 208. It here comprises moreover another switch 218' for activating a button 214' formed so that the flow occurs within one and the same tap 208. In other words, the tap 208 of the tank 101 (as shown for example in FIGS. 16 to 19) is here a single tap which comprises two buttons 214, 214' for drawing a beverage respectively from the first chamber 102 and the second chamber 103. The appliance 200 according to this second embodiment comprises moreover a connection interface 219 comprising an electrical connection 219a and a fluidic connector 219b here formed by three orifices, for attaching thereto the openings 104, 105, 106 of the tank 101 (for example as shown in FIGS. 16 to 19).

FIGS. 16 to 19 show a tank 101 according to a fourth embodiment of the present invention. The common elements in the example shown in FIGS. 1 to 5 are not described again. Such a tank 101 differs from the embodiment in FIGS. 1 to 5 in that it comprises moreover a compact dispensing assembly 123. This assembly 123 here comprises for example a UV sterilizer 217 connected to the single tap 208. Such a sterilizer, well known to a person skilled in the art, is not described in detail here. A plug 124 makes it possible for example to connect it to an electrical connection 219a of an appliance 200 as previously shown. The plug 124 makes it possible for example to electrically supply the UV sterilizer 217. A fluidic connector 125 makes it possible for example to connect the tank 101 to a fluidic connector 219b of an appliance 200 as shown previously. The fluidic connector 125 here comprises three connectors 125a, 125b, 125c, intended to cooperate with the three orifices of the fluidic connector 219b. A first connector 125a, here central, makes it possible to connect the first opening 104 to a water intake for filling the tank 101. A second connector 125b, here situated on the side of the second opening 105, makes it possible to connect the second opening 105 to a fresh water outlet for supplying a carbonator for producing carbonated water for example, in addition to its attachment to the button 214 for connection to the tap 208, while passing through the UV sterilizer 217. Similarly, a third connector 125c, here situated on the side of the third opening 106, makes it possible to connect the third opening 106 to a water outlet at room temperature to supply a water-heater for example, in addition to its attachment to the button 214' for connection to the tap 208, while passing through the UV sterilizer 217. At least the UV sterilizer 217, or even the entire compact dispensing assembly 123 is advantageously assembled with the rest of the tank 101 in such a way that it cannot be disassembled, for example by bonding and/or welding.

Finally, FIG. 20 shows the presence of non-return valves 107d, 108d, 109d. It is noted that in the embodiment shown here, each of the openings has a non-return valve; a valve 109d is attached to the first opening 104, a valve 107d is attached to the second opening 105, and a valve 108d is attached to the third opening 106. Moreover, each of the valves 107d, 108d, 109d is here positioned on the opposite side of the openings with respect to the corresponding filters. In other words, a filtration means is here positioned between an opening and a valve. The valves are thus positioned towards the water contained in the tank, which is for example convenient in a configuration according to which, during the use of the tank, each of the filters 107, 108 and 109 are located at least partially immersed in the water contained in the tank. The valves thus make it possible to avoid the immersion in the water of the filtration means contained in each of the filters, limiting their risk of absorption of the chlorine contained in the water of the tank for example, or the filtration means being needlessly subjected to wear.

It is noted moreover that the non-return valve 109d attached to the first opening 104 forming an inlet is positioned inverted with respect to the valves 107d and 108d attached to the second opening 105 and to the third opening 106 which form outlets. In the case of an inlet, it is preferable to avoid water spilling outside the tank, while in the case of an outlet it is preferable to ensure that water does not flow back into the tank.

In the embodiment of FIG. 20, each valve is of the guided disk type, so that a passage for the water is opened under the action of water pressure. They are for example produced from a flexible material, for example silicone or EPDM (ethylene-propylene-diene monomer).

Thus, when water is not being drawn by a user, the valves remain closed, making it possible to limit risks of backflow and/or contact between the filtration means and the water contained in the tank.

Of course, the present invention is not limited either to the above description or to the attached figures, but extends to any variant within the scope of a person skilled in the art.

When "the" is used after a first occurrence of the expression "at least", it is understood that this article corresponds to the singular or the plural, i.e. the plural is not excluded.

The invention claimed is:

1. A removable tank (101) for a beverage dispensing appliance (200) connectable to a water supply system (300), the tank (101) comprising:
   at least one storage chamber (102);
   a first opening (104) forming an inlet;
   a second opening (105) forming an outlet connectable to a tap; and
   a water filter (107) fluidically connected to the second opening (105) of the tank (101) downstream of the storage chamber (102),
   wherein the first opening (104), the second opening (105), and a container (107a) of the filter (107) in communication with the second opening (105) form a unit (100) of elements which cannot be reassembled after dismantling, and said unit of elements (100) is permanently fixed to a neck (115) of the tank (101).

2. The removable tank (101) according to claim 1, further comprising:
   a second storage chamber (103); and
   a second filter (108) fluidically connected to a third opening (106) forming a second outlet.

3. The removable tank (101) according to claim 2, wherein the filter (107) fluidically connected to the second opening (105) is situated within a body of the tank (101).

4. The removable tank (101) according to claim 2, wherein the second filter (108) fluidically connected to the third opening (106) is situated within a body of the tank (101).

5. The removable tank (101) according to claim 2, wherein the second filter (108) fluidically connected to the third opening (106) comprises activated carbon.

6. The removable tank (101) according to claim 1, wherein the first opening (104) is fluidically connected to an other filter (109).

7. The removable tank (101) according to claim 6, wherein the other filter (109) fluidically connected to the first opening (104) is situated within a body of the tank (101).

8. The removable tank (101) according to claim 6, wherein the third filter (109) fluidically connected to the opening (104) comprises any of i) a mechanical filter that retains sediments and particles, ii) a filtering resin, and iii) silver salts.

9. The removable tank (101) according to claim 1, wherein the filter (107) fluidically connected to the second opening (105) comprises activated carbon.

10. The removable tank (101) according to claim 1, wherein the unit (100) of elements further comprises a platform (120) having on an upper face at least the first opening (104) and the second opening (105), and on a lower face at least the container (107a) of the filter (107) in communication with the second opening (105).

11. The removable tank (101) according to claim 1, wherein the unit (100) of elements is fixed on a rim (115a) of the neck (115) of the tank (101).

12. The removable tank (101) according to claim 1, further comprising:
   a water dispensing tap (208) connected to the second opening (105).

13. The removable tank (101) according to claim 12, further comprising:
   a UV sterilizer (217) connected to the tap (208).

14. The removable tank (101) according to claim 1, wherein a non-return valve is attached to one of the first opening and the second opening.

15. A beverage dispensing appliance (200) connectable to a water supply system (300), comprising:
   an enclosure (211);
   a water intake (203) attachable to a water intake pipe from the water supply system (300);
   a water dispensing tap (208); and a removable tank (101) according to claim 1, the storage chamber of which (102) is situated at least partially within the enclosure (211).

16. The appliance (200) according to claim 15, further comprising:
    a pressure shut-off solenoid valve (205) situated between the first opening (104) of the tank (101) and the water intake (203) of the appliance (200).

17. The appliance (200) according to claim 16, further comprising:
    a pressure regulator (204) upstream of the solenoid valve (205).

18. The appliance (200) according to claim 16, wherein the water dispensing tap (208) is equipped with an actuator and provided with a button (214) and electrical microcontacts (212) for actuating the solenoid valve (205).

19. The removable tank (101) according to claim 1, wherein the filter (107) fluidically connected to the second opening (105) is situated within a body of the tank (101).

20. A removable tank (101) for a beverage dispensing appliance (200) connectable to a water supply system (300), the tank (101) comprising:
    a body, formed at least by a base, a storage chamber (102), and a neck (115);
    a housing unit (100), forming a first opening (104) that provides an inlet, a second opening (105) that provides an outlet connectable to a tap, and a container (107a), said housing unit (100) placed within the neck (115) of the body and non-removably affixed to the neck (115) of the body; and
    a water filter, housed inside the container (107a) and in fluid connection with the second opening (105) downstream of the storage chamber (102),
    wherein the housing unit is non-removably affixed to the neck of the body such that the housing unit cannot be dissembled from the body without damaging the housing unit such to render impossible any reassembly of the housing unit with the body.

* * * * *